(12) United States Patent
Mucci et al.

(10) Patent No.: US 11,866,638 B2
(45) Date of Patent: Jan. 9, 2024

(54) DRILLING FLUID COMPOSITION COMPRISING VEGETABLE DERIVATIVES

(71) Applicant: YPF TECNOLOGÍA S.A., Ciudad Autónoma de Buenos Aires (AR)

(72) Inventors: Marcela Zaira Mucci, Ciudad Autónoma de Buenos Aires (AR); Leandro Ariel Sanz, Quilmes (AR); Luciana Martina García Eiler, Berisso (AR); Manuel Ramiro Sanz, Berazategui (AR)

(73) Assignee: YPF TECNOLOGÍA S.A., Ciudad Autónoma de Buenos Aires (AR)

( * ) Notice: Subject to any disclaimer, the term of this patent is extended or adjusted under 35 U.S.C. 154(b) by 0 days.

(21) Appl. No.: 17/895,926

(22) Filed: Aug. 25, 2022

(65) Prior Publication Data

US 2023/0064252 A1  Mar. 2, 2023

Related U.S. Application Data

(60) Provisional application No. 63/236,820, filed on Aug. 25, 2021.

(51) Int. Cl.
   *C09K 8/36* (2006.01)

(52) U.S. Cl.
   CPC ..................... *C09K 8/36* (2013.01)

(58) Field of Classification Search
   None
   See application file for complete search history.

(56) References Cited

U.S. PATENT DOCUMENTS

| | | | |
|---|---|---|---|
| 4,631,136 A | 12/1986 | Jones, III | |
| 10,384,178 B2* | 8/2019 | Baseeth | A61K 8/365 |
| 2016/0002522 A1* | 1/2016 | Gaertner | C09K 8/04 |
| | | | 507/128 |
| 2017/0191008 A1* | 7/2017 | Baseeth | C09K 8/035 |

FOREIGN PATENT DOCUMENTS

| | | |
|---|---|---|
| EP | 0382071 A1 | 8/1990 |
| EP | 0753034 A1 | 1/1997 |

\* cited by examiner

*Primary Examiner* — John J Figueroa
(74) *Attorney, Agent, or Firm* — Muncy, Geissler, Olds & Lowe, P.C.

(57) ABSTRACT

A drilling fluid composition comprising a continuous phase and a disperse phase, the continuous phase comprising fatty acid methyl esters derived from soy oil, and sunflower lecithin as an emulsifier. A method for increasing the electrical stability of a drilling fluid composition.

9 Claims, No Drawings

DRILLING FLUID COMPOSITION COMPRISING VEGETABLE DERIVATIVES

CROSS REFERENCE TO RELATED APPLICATIONS

This application claims priority of U.S. Provisional Application No. 63/236,820 filed on Aug. 25, 2021 under 35 U.S.C. § 119(e), the entire contents of which are hereby incorporated by reference.

TECHNICAL FIELD

The present invention generally relates to the field of fluids for drilling operations. Specifically, the present invention relates to a drilling fluid composition comprising fatty acid methyl esters derived from a vegetable source, as well as methods of use thereof.

BACKGROUND

In the oil and gas industry, several unconventional wells are currently drilled using oil-based muds (OBMs) based on invert emulsions, in which oil is the main constituent of a continuous phase, while water is the dispersed phase.

In order to obtain these drilling muds or fluids, fuel oil is generally employed as the continuous phase. A calcium chloride ($CaCl_2$)) brine solution is typically used for the dispersed phase, at ratios of about 90:10, 80:20 or 70:30.

In addition to gasoil compound being a health hazard and having a negative environmental impact, the OBM cuttings generated in the well by the use of these drilling fluids also entails physical and/or chemical treatment processes, in order to reduce their aromatic content, thereby minimizing their environmental impact.

In the case of unconventional wells, the geological composition, such as the presence of hydratable or otherwise reactive clays can result in several issues such as well instability, increased drag and torque when using OBMs for drilling operations.

Drilling fluids comprising components derived from vegetable sources, such as described for example in U.S. Pat. No. 4,631,136 A, EP 0,382,071 A1 and EP 0,753,034 A1, provide ecological products with a decreased environmental impact while also reducing operational risks. However, the performance of these types of drilling fluids can be lower than that of OBMs.

There is therefore a need to provide a drilling fluid based on vegetable derivatives that has increased performance during drilling operations as compared to similar fluids of the prior art, and that provides a performance similar to that of OBMs, while advantageously reducing the environmental impact.

SUMMARY

The present invention provides a solution to the shortcomings of the prior art by providing a drilling mud composition mainly derived from vegetable sources, reducing the fluid environmental impact, while having improved thermal stability and achieving results similar to those obtained using OBMs in drilling operations.

Therefore, a first object provided by the present invention is a drilling fluid composition comprising a continuous phase and a disperse phase, the continuous phase comprising a vegetable derivative, wherein the vegetable derivative is selected from a soy derivative and an emulsifier. The emulsifier allows obtaining a stable emulsion. The vegetable derivative comprises fatty acid methyl esters (FAMEs). Preferably, the disperse phase comprises a brine solution. Most preferably, the disperse phase comprises a brine solution comprising 20% $CaCl_2$ in weight.

In preferred embodiments, the emulsifier is a n-alkyl carboxylate. Specifically, sunflower lecithin.

Advantageously, the FAME-based drilling fluid composition of the invention does not rely on a chemical modification, such as hydrogenation, of the FAMEs.

In embodiments, the drilling fluid composition comprises one or more additives selected from a viscosifier, a rheology modifier, a filtration reducer and a densifier.

In a preferred embodiment, the viscosifier is an organophilic clay, the filtration reducer is gilsonite, the densifier is baryte, and a fatty acid amide is used as a rheology modifier.

In preferred embodiments, the drilling fluid composition comprises an emulsifier selected from specific emulsifiers. Preferably, the emulsifier is present in the composition in an amount of about 4% to about 6% (v/v), more preferably 5% (v/v). In another preferred embodiment, the emulsifier is present in the composition in an amount of about 0.5% to about 3% (v/v).

DETAILED DESCRIPTION

The invention will be described in further detail below.

As used herein, the term "fuel oil", or interchangeably "gasoil", relates to a fraction obtained by petroleum distillation, comprising distillates and residues, consisting essentially of long-chain hydrocarbons, namely alkanes, cycloalkanes, and aromatics.

The term "fatty acid methyl ester (FAME)" as used herein refers to fatty esters derived from transesterification of triglycerides with methanol. In the context of the invention FAME refers to esters derived from triglycerides of vegetable origin, such as vegetable oil. These compounds are comprised in the "vegetable base" that is used in the drilling fluid compositions of the present invention, and which differs from the fuel oil used in traditional drilling fluid compositions of OBMs. Non-limiting examples of the vegetable oils that may be used to prepare the vegetable base by transesterification include soy oil, sunflower oil, canola oil, palm oil, cottonseed oil and Jatropha oil. Preferred embodiments of the drilling fluid compositions provided by the invention use FAMEs derived from soy oil.

The inventors found that certain n-alkyl carboxylate compounds, such as sunflower lecithin, can be successfully employed to formulate drilling muds, when used emulsifiers for an oil-in-water (O/W) emulsion. Surprisingly, the formulated drilling muds display properties equivalent to those of conventional OBMs, such us density, rheological properties, electrical stability, retort and HPHT filtrate values.

Sunflower lecithin is a commercially available vegetable derivative employed as an emulsifier in several technology fields, such as the food and cosmetic industries. This compound presents a low solubility in water, but in an aqueous solution, such as an oil-in-water solution, phospholipids may form micelles, resulting in an amphiphilic surfactant.

By using lecithin or other n-alkyl carboxylates as an emulsifier, the use of strong bases such as calcium or sodium hydroxide is advantageously avoided, since there is no need for activating the emulsifier. The use of strong bases in the presence of the triglycerides of the FAME results in saponification reactions, which hinder the product application when subjected to high temperatures.

The adequate vegetable base for the drilling fluid composition may be selected according to methods known in the art, such as by determining the Equivalent Alkane Carbon Number (EACN). This dimensionless number is a parameter related to the hydrophobicity of the vegetable base and reflect the ability of these fatty acid molecules to penetrate the interfacial film.

The EACN may be measured using commercially available equipment, such as a SITE100 spinning drop tensiometer as provided by Krüss.

The value of the EACN obtained is subsequently correlated to an emulsifier concentration using empirical correlations, in order to determine which emulsifiers are suitable for a given FAME composition at specific emulsion composition and temperature conditions.

As a first step, an emulsion comprising a FAME base and brine solution at 20% (w/w) $CaCl_2$ was assessed at 40° C., resulting in the following suitable emulsifiers:

Ionic Emulsifiers:
Isoalkyl phenols, $C_{12}$ to $C_{14}$
N-alkyl carboxylate $C_{16}$
N-alkyl sulfonate $C_{20}$ Non-Ionic Emulsifiers:
Surfactants between sorbitan monolaurate (Span 20) and polysorbates such as Tween 85

As a second step, temperatures of 105° C. were evaluated, representative of the conditions to which a drilling fluid is subjected. For these conditions, isoalkyl phenols, 018 to 020 were found to be suitable ionic emulsifiers.

According to these results, a n-alkyl carboxylate would not be an adequate emulsifier for conditions with a temperature of about 105° C. Surprisingly, as shown in the examples below, the inventors found that a chemical compound of the n-alkyl carboxylate family, i.e. sunflower lecithin, displayed adequate emulsifying properties at both 40° C. as well as 105° C., even though this compound does not belong to any of the emulsifier families detected for 105° C.

This fact may indicate that the properties of the emulsifiers identified for 40° C. are not significantly altered by the temperature conditions, when used in a drilling fluid comprising commonly employed additives in addition to the emulsifier.

EXAMPLES

Formulation of a FAME-Based Drilling Fluid Using Sunflower Lecithin

A drilling mud composition was formulated in order to assess its rheological properties, as compared to those of an OBM.

The vegetable-derived, i.e. FAME-based, drilling fluid was tested before and after an aging process, carried out at 105° C. during 16 h in a roller oven.

In order to adequately compare the relevant physical properties of both the FAME-based formulation of the invention and the OBM, a rheology modifier (Fatty Acid Amide), a filtration reducer (Gilsonite) and a densifier (Baryte) were included in both formulations. An organophilic clay was used as a viscosifier.

The formulations for both drilling fluids are shown in Tables 1 and 2 below:

TABLE 1

Formulation for a FAME-based fluid of the invention

| FAME-based fluid | Units | Amount |
|---|---|---|
| FAME | $L/m^3$ | 617 |
| Organophilic clay | $kg/m^3$ | 5 |
| Sunflower lecithin | $L/m^3$ | 9 |
| Calcium Chloride | $Kg/m^3$ | 49 |
| Water | $L/m^3$ | 265 |
| Fatty Acid Amide | $L/m^3$ | 3 |
| Gilsonite | $kg/m^3$ | 16 |
| Baryte | $kg/m^3$ | 361 |

TABLE 2

Formulation for an OBM

| OBM | Units | Amount |
|---|---|---|
| Fuel oil | $L/m^3$ | 685 |
| Organophilic clay | $kg/m^3$ | 16 |
| Primary emulsifier | $L/m^3$ | 2 |
| Secondary emulsifier | $L/m^3$ | 10 |
| Calcium hydroxide | $kg/m^3$ | 10 |
| Brine ($CaCl_2$, 20% w/w) | $L/m^3$ | 187 |
| Fatty Acid Amide | $L/m^3$ | 3 |
| Gilsonite | $kg/m^3$ | 8 |
| Baryte | $kg/m^3$ | 402 |

The following tests were carried out for each of the formulations following the standard API RP 13B-2: viscosity, plastic viscosity, yield point, gel, high-pressure, high-temperature (HTPT) filtration.

The volumetric compositions of each phase (0, W and S for the solid fraction) were determined using the retort test of standard API RP 13B-2.

Experimental results for both drilling fluids, both before and after the aging process, are shown in Table 3 below. Viscosity results indicate the reading on a OFITE's model 900 rotational viscometer.

TABLE 3

Measured properties for a FAME-based fluid of the invention and an OBM

| | | FAME-based fluid | | OBM | |
|---|---|---|---|---|---|
| Property | Units | Before aging | After aging | Before aging | After aging |
| Density | g/L | 1240 | 1240 | 1210 | 1210 |
| Electrical stability | V | 161 | 328 | 671 | 1052 |
| Viscosity 600 rpm | DR | 52 | 45 | 32.4 | 28.3 |
| Viscosity 300 rpm | DR | 31 | 25 | 18.2 | 15.8 |
| Viscosity 200 rpm | DR | 24 | 17 | 11.9 | 10.1 |
| Viscosity 100 rpm | DR | 17 | 11 | 7.4 | 6 |
| Viscosity 6 rpm | DR | 9.2 | 5.4 | 2.9 | 2.5 |
| Viscosity 3 rpm | DR | 8.2 | 5.1 | 2.7 | 2.4 |
| Plastic viscosity | cP | 21 | 20 | 14.159 | 12.497 |
| Yield point | lb/100 $ft^2$ | 10 | 5 | 4.3388 | 3.5337 |
| Gel 10 seconds | lb/100 $ft^2$ | 9 | 5 | 3 | 3 |

TABLE 3-continued

Measured properties for a FAME-based fluid of the invention and an OBM

| Property | Units | FAME-based fluid | | OBM | |
|---|---|---|---|---|---|
| | | Before aging | After aging | Before aging | After aging |
| Gel 10 minutos | lb/100 ft² | 9 | 5 | 4 | 5 |
| HPHT filtration @ 225° F./500 dpsi | ml | 4 | 5 | 3.6 | 2.8 |
| % S | % v | 21.4 | 21.4 | 13 | 16 |
| % W | % v | 24 | 24 | 19 | 17.5 |
| % O | % v | 54.6 | 54.6 | 68 | 66.5 |
| Ratio O/W | % v | 70/30 | 70/30 | 78.2/21.8 | 79.17/20.83 |

The experiment results show that FAME-based fluids of the invention have adequate properties, i.e. density, rheological properties and filter values for their use as drilling fluids compared to traditional OBMs.

The invention claimed is:

1. A drilling fluid composition comprising a continuous phase and a disperse phase, the continuous phase comprising fatty acid methyl esters derived from soy oil, and sunflower lecithin as an emulsifier, and the disperse phase comprising a brine solution comprising 20% $CaCl_2$) in weight.

2. The composition of claim 1, further comprising one or more additives selected from a viscosifier, a rheology modifier, a filtration reducer and a densifier.

3. The composition of claim 1, further comprising an organophilic clay as a viscosifier, a fatty acid amide as a rheology modifier, gilsonite as a filtration reducer and baryte as a densifier.

4. The composition of claim 1, wherein the emulsifier is at a concentration of about 4% to about 6% in volume.

5. The composition of claim 4, wherein the emulsifier is at a concentration of about 5% in volume.

6. The composition of claim 1, wherein the emulsifier is at a concentration of about 0.5% to about 3% (v/v).

7. A method for increasing the electrical stability of a drilling fluid composition comprising a continuous phase and a disperse phase, the continuous phase comprising fatty acid methyl esters derived from soy oil and the disperse phase comprising a brine solution comprising 20% $CaCl_2$) in weight, the method comprising adding sunflower lecithin as an emulsifier to reach a concentration of about 4% to about 6% in volume.

8. The method according to claim 7, wherein the emulsifier is added to reach a concentration of about 5% in volume.

9. A method for increasing the electrical stability of a drilling fluid composition comprising a continuous phase and a disperse phase, the continuous phase comprising fatty acid methyl esters derived from soy oil and the disperse phase comprising a brine solution comprising 20% $CaCl_2$) in weight, the method comprising adding sunflower lecithin as an emulsifier to reach a concentration of about 0.5% to about 3% in volume.

* * * * *